US012073971B2

(12) United States Patent
Yoon et al.

(10) Patent No.: US 12,073,971 B2
(45) Date of Patent: Aug. 27, 2024

(54) COIL COMPONENT

(71) Applicant: SAMSUNG ELECTRO-MECHANICS CO., LTD., Suwon-si (KR)

(72) Inventors: Chan Yoon, Suwon-si (KR); Dong Hwan Lee, Suwon-si (KR); Dong Jin Lee, Suwon-si (KR); Sang Soo Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 584 days.

(21) Appl. No.: 17/110,976

(22) Filed: Dec. 3, 2020

(65) Prior Publication Data

US 2022/0013270 A1 Jan. 13, 2022

(30) Foreign Application Priority Data

Jul. 10, 2020 (KR) ........................ 10-2020-0085404

(51) Int. Cl.
*H01F 27/24* (2006.01)
*H01F 17/04* (2006.01)
*H01F 27/32* (2006.01)

(52) U.S. Cl.
CPC ......... *H01F 17/045* (2013.01); *H01F 27/324* (2013.01)

(58) Field of Classification Search
CPC ...... H01F 17/045; H01F 27/324; H01F 19/04; H01F 27/2895; H01F 27/306; H01F 17/04; H01F 27/2804; H01F 2017/048; H01F 27/006; H01F 27/24; H01F 27/323
See application file for complete search history.

(56) References Cited

U.S. PATENT DOCUMENTS 3,238,484 A * 3/1966 Dacey .................... H01F 17/062 336/84 R
3,944,937 A * 3/1976 Fujisawa ................ H03H 11/28 333/14
2011/0279214 A1* 11/2011 Lee ......................... H01F 19/04 29/605

FOREIGN PATENT DOCUMENTS

JP 4350268 B2 10/2009
JP 2011-199098 A 10/2011

OTHER PUBLICATIONS

Jong-Pil Lee et al., "Analysis and Design of Coupled Inductors for Two-Phase Interleaved DC-DC Converters", Journal of Power Electronics, vol. 13, No. 3, pp. 339-348, May 2013.
ELEC 24409: Circuit Theory 2, Dr. Kalyana Veluvolu.

* cited by examiner

*Primary Examiner* — Tuyen T Nguyen
(74) *Attorney, Agent, or Firm* — MORGAN, LEWIS & BOCKIUS LLP

(57) ABSTRACT

A coil component includes a core portion, and first and second coil portions wound to form at least one or more turns on the core portion. The core portion includes a first core portion on which the first coil portion is wound, a second core portion on which the second coil portion is wound, and a third core portion which is disposed to be spaced apart from and between the first and second core portions and on which the first and second coil portions are wound to overlap each other.

20 Claims, 4 Drawing Sheets

COIL COMPONENT

CROSS-REFERENCE TO RELATED APPLICATION(S)

This application claims the benefit under 35 USC 119 (a) of Korean Patent Application No. 10-2020-0085404 filed on Jul. 10, 2020 in the Korean Intellectual Property Office, the entire disclosure of which is incorporated herein by reference for all purposes.

TECHNICAL FIELD

The present disclosure relates to a coil component.

BACKGROUND

Inductors, as coil components, are representative passive electronic components used in electronic devices, along with resistors and capacitors.

As electronic devices have become increasingly better in terms of performance, and smaller, electronic components used in electronic devices are increasing in number and are being miniaturized in size.

Accordingly, there is an increasing demand for a coupled coil component to reduce the mounting area of the component. To increase the efficiency of components within the same size, a coupling coefficient may be increased by increasing the mutual inductance, or the coupling coefficient may be appropriately reduced by increasing leakage inductance. For example, it is necessary to appropriately adjust the coupling coefficient by adjusting the above-described mutual inductance and leakage inductance by appropriately modifying the shape of the coil portion of the coupled inductor according to the needs in the art.

As an example, as a method for adjusting the coupling coefficient without increasing the thickness of a component, there is a case of winding in a bifilar shape such that a plurality of adjacent conductors overlap each other.

SUMMARY

Exemplary embodiments provide a coil component having a coupled inductor structure in which mutual inductance between coil portions may be effectively controlled.

According to an aspect of the present disclosure, a coil component includes a core portion, and first and second coil portions wound to form one or more turns on the core portion. The core portion includes a first core portion on which the first coil portion is wound, a second core portion on which the second coil portion is wound, and a third core portion which is disposed to be spaced apart from and between the first and second core portions and on which the first and second coil portions are wound to overlap each other.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
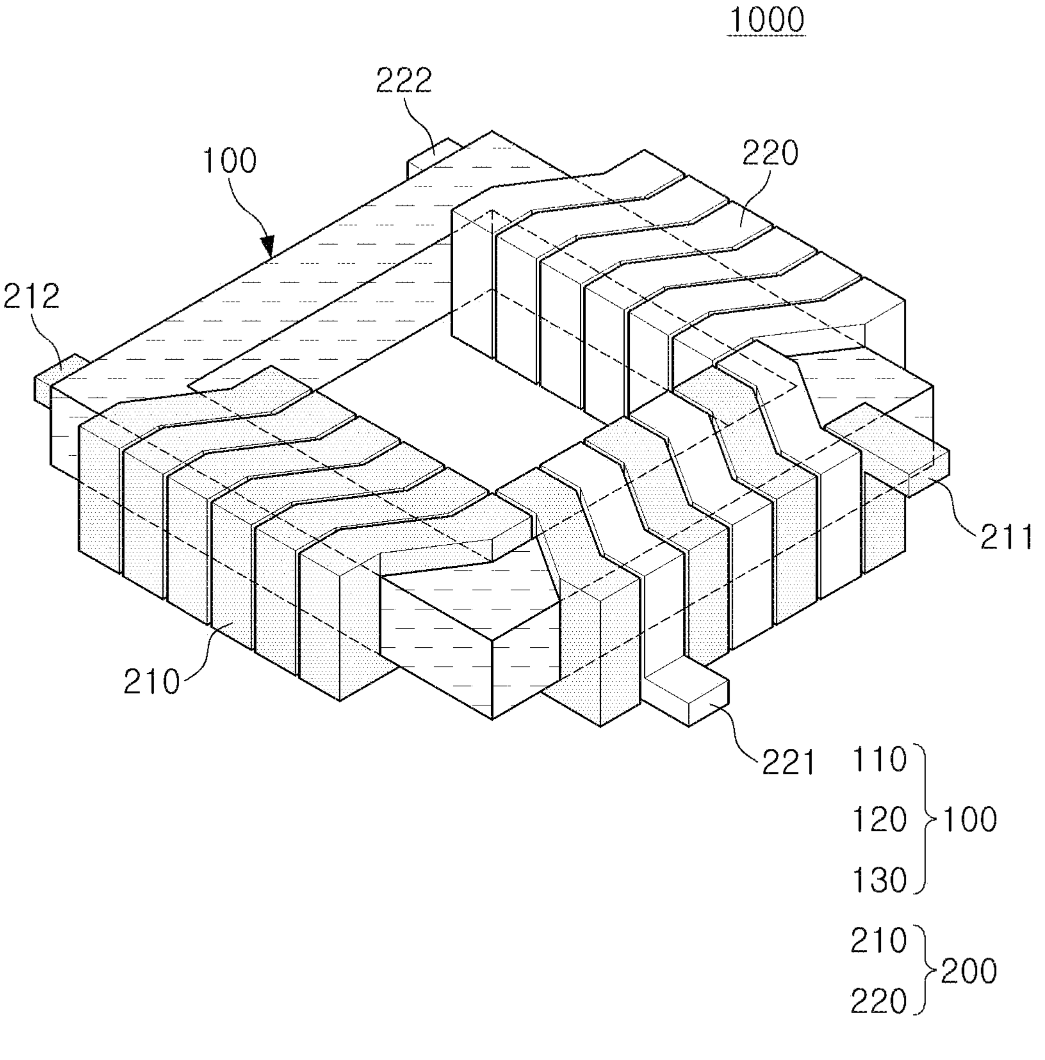
FIG. 1 is a view schematically illustrating a coil component according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. In addition, throughout the specification, the term "on" means to be positioned above or below the target portion, and does not necessarily mean to be positioned above, based on the direction of gravity.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of the present disclosure. Further, although the examples described herein have a variety of configurations, other configurations are possible as will be apparent after gaining an understanding of the disclosure of the present disclosure.

The drawings may not be to scale, and the relative sizes, proportions, and depiction of elements in the drawings may be exaggerated for clarity, illustration, and convenience.

Since the sizes and thicknesses of respective components illustrated in the drawings are arbitrarily illustrated for convenience of description, the present disclosure is not necessarily limited to the illustration of the drawings.

In the drawings, the X direction may be defined as a first direction or a length direction, the Y direction may be defined as a second direction or a width direction, and the Z direction may be defined as a third direction or a thickness direction.

Hereinafter, a coil component according to an embodiment will be described in detail with reference to the accompanying drawings, and in the description with reference to the accompanying drawings, the same or corresponding components are assigned the same reference numbers and overlapped descriptions thereof are omitted.

Various types of electronic components are used in electronic devices, and various types of coil components may be appropriately used between the electronic components, to remove noise or the like.

For example, coil components in electronic devices may be used as power inductors, high frequency inductors (HF inductors), general beads, high frequency beads (GHz beads), common mode filters, or the like.

Wound Coil Component

First Embodiment

FIG. 1 is a view schematically illustrating a coil component according to an embodiment.

Figure 2:
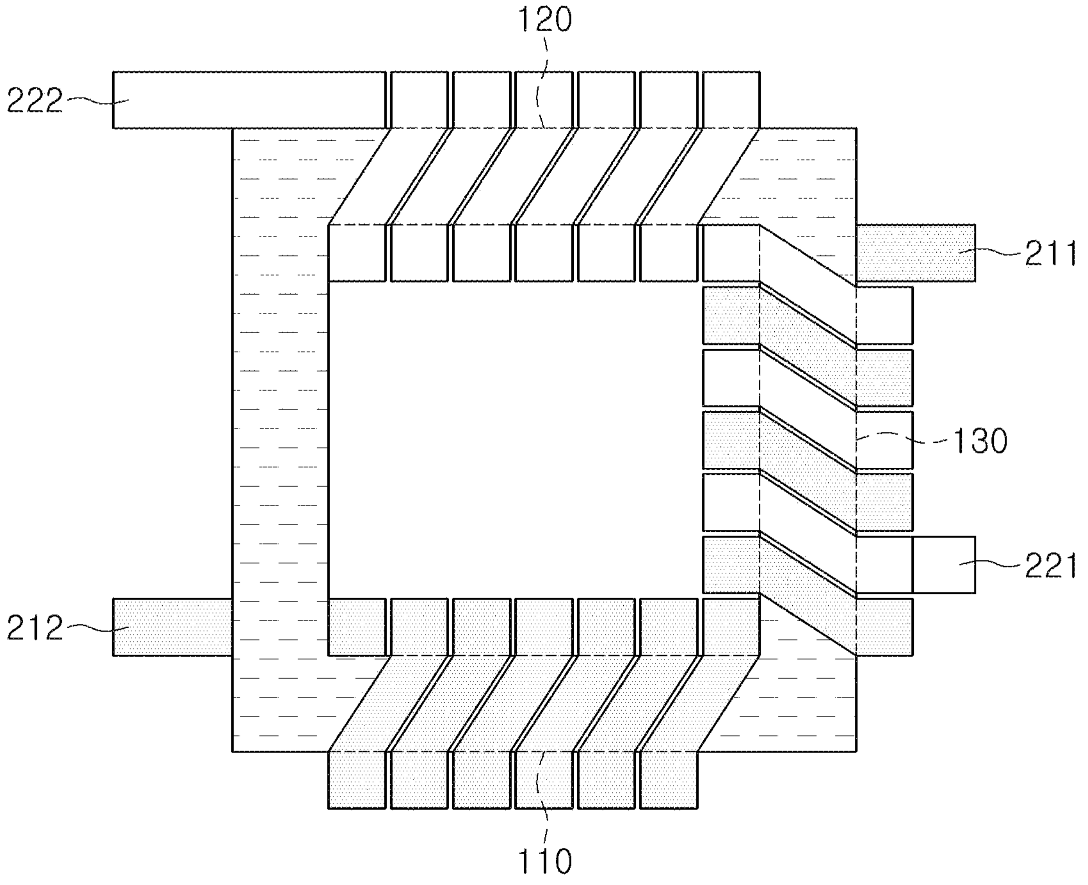
FIG. 2 is a view of the coil component of FIG. 1 viewed from above.

FIG. 2 is a view of the coil component of FIG. 1 viewed from above.

Figure 3:
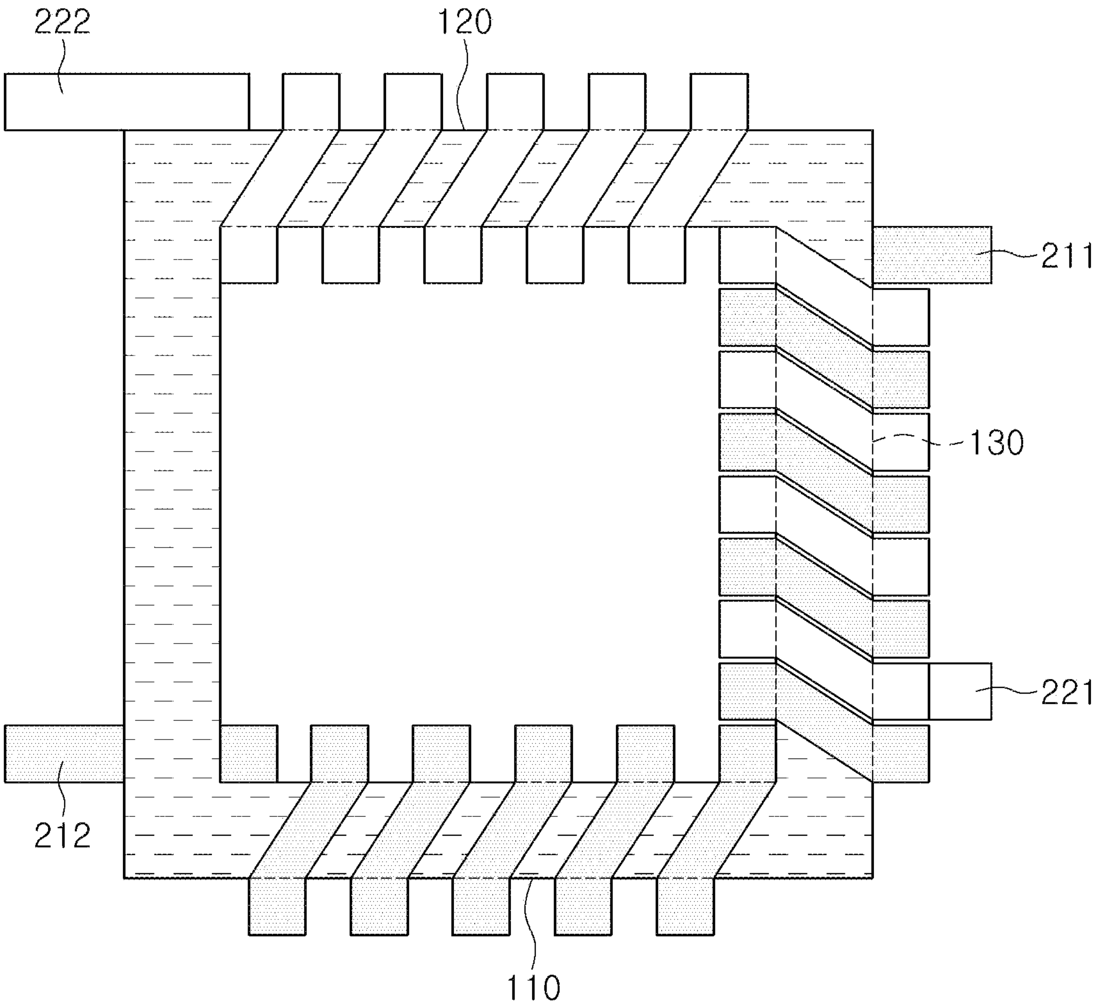
FIG. 3 is a view corresponding to FIG. 2 according to a modified example of an embodiment.

FIG. 3 is a view corresponding to FIG. 2 according to a modified example of the embodiment of the present disclosure.

Figure 4:
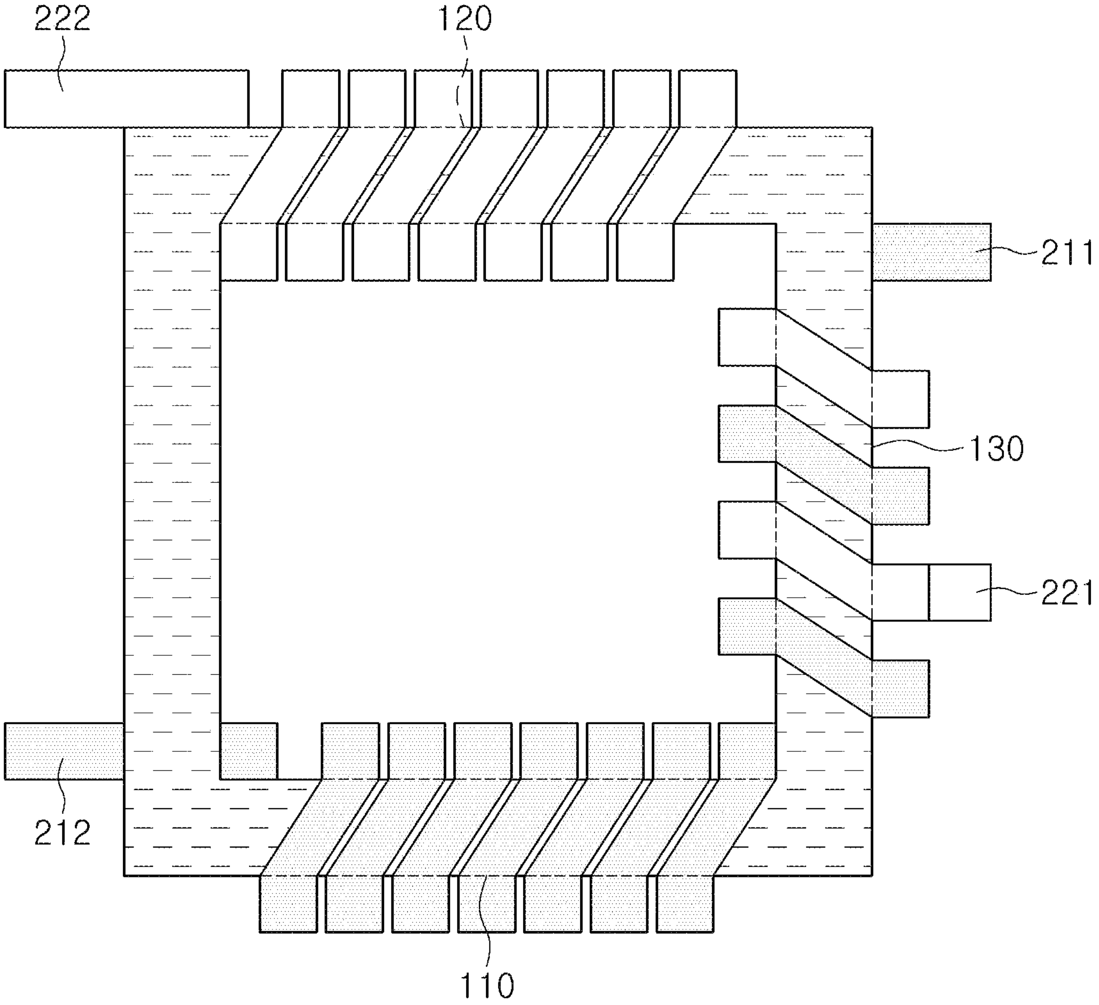
FIG. 4 is a view corresponding to FIG. 2 according to another modified example of an embodiment.

FIG. 4 is a view corresponding to FIG. 2 according to another modified example of the embodiment.

Referring to FIGS. 1 to 4, a coil component 1000 according to an exemplary embodiment may include a core portion 100 and first and second coil portions 210 and 220.

The core portion 100 forms the exterior of the coil component 1000 according to the present embodiment, and may be formed in a toroidal shape forming a closed loop.

The core portion 100 includes a first core portion 110 on which the first coil portion 210 to be described later is wound, a second core portion 120 on which the second coil portion 220 is wound, and a third core portion 130, which is disposed between the first and second core portions 110 and 120 and on which the first and second coil portions 210 and 220 are wound to be adjacent to each other.

The core portion 100 may include a magnetic material and an insulating resin. Specifically, the core portion 100 may be formed by stacking one or more magnetic sheets including an insulating resin and a magnetic material dispersed in the insulating resin. The core portion 100 may also have a different structure, in addition to the structure in which a magnetic material is dispersed in an insulating resin. For example, the core portion 100 may be formed of a magnetic material such as ferrite.

The magnetic material may be ferrite or magnetic powder.

The ferrite may be at least one or more of, for example, Mg—Zn-based, Mn—Zn-based, Mn—Mg-based, Cu—Zn-based, Mg—Mn—Sr-based, Ni—Zn-based spinel ferrites, Ba—Zn-based, Ba—Mg-based, Ba—Ni-based, Ba—Co-based, Ba—Ni—Co-based hexagonal ferrites, and Y-based garnet-type ferrite and Li-based ferrite.

Magnetic metal powder may include at least one of iron (Fe), silicon (Si), chromium (Cr), cobalt (Co), molybdenum (Mo), aluminum (Al), niobium (Nb), copper (Cu), nickel (Ni) and alloys thereof. For example, the magnetic metal powder may be at least one or more of pure iron powder, Fe—Si alloy powder, Fe—Si—Al alloy powder, Fe—Ni alloy powder, Fe—Ni—Mo alloy powder, Fe—Ni—Mo—Cu alloy powder, Fe—Co alloy powder, Fe—Ni—Co alloy powder, Fe—Cr alloy powder, Fe—Cr—Si alloy powder, Fe—Si—Cu—Nb alloy powder, Fe—Ni—Cr alloy powder, and Fe— Cr—Al alloy powder.

The magnetic metal powder may be amorphous or crystalline. For example, the magnetic metal powder may be a Fe—Si—B—Cr-based amorphous alloy powder, but is not limited thereto.

Ferrite and magnetic metal powder may each have particles having an average diameter of about 0.1 μm to 30 μm, but are not limited thereto.

The core portion 100 may include two or more types of magnetic materials dispersed in an insulating resin. In this case, that the magnetic materials are of different types means that the magnetic materials dispersed in the insulating resin are distinguished from each other by any one of an average diameter, composition, crystallinity, and shape.

The insulating resin may include, but is not limited to, epoxy, polyimide, liquid crystal polymer, or the like alone or as a mixture.

The coil portion 200 is wound on the core portion 100 to express characteristics of a coil component. For example, when the coil component 1000 of the present embodiment is used as a power inductor, the coil portion 200 may serve to stabilize power of an electronic device by storing an electric field as a magnetic field and maintaining an output voltage.

In this embodiment, the first and second coil portions 210 and 220 may be formed by winding a metal conductor such as a copper conductor in a spiral shape. As described later, an insulating layer (not illustrated) may be disposed on the surface of each of a plurality of turns of the first and second coil portions 210 and 220.

The coil portion 200 includes the first and second coil portions 210 and 220 wound to form at least one or more turns on the core portion 100. The first and second coil portions 210 and 220 wound on the third core portion 130 may be wound as bifilar windings. In this embodiment, the winding refers to a winding comprised of two adjacent insulated conductors. As an example of the aforementioned bifilar winding, the first and second coil portions 210 and 220 wound on the third core portion 130 may overlap each other and/or may be alternately disposed.

Referring to FIG. 2, the number of turns of the first and second coil portions 210 and 220 wound on the third core portion 130 may be the same as the number of turns of the first coil portion 210 wound on the first core portion 110 or the number of turns of the second coil portion 220 wound on the second core portion 120. Table 1 below illustrates that in a coil component having a length of 2.5 mm, a width of 2.5 mm, and a thickness of 0.5 mm, the cross-sectional area of the coil portion 200 is 80 μm*80 μm, and the cross-sectional area of the core portion 100 is 300 μm*300 μm, and the coupling coefficient is measured. For example, the above-described coil component is formed, such that the number of turns of the first coil portion 210 on the first core portion 110, the number of turns of the second coil portion 220 on the second core portion 120, and the number of turns of the first and second coil portions 210 and 220 on the third core portion 130 are the same as each other, and then, the coupling coefficient (k) value is measured.

TABLE 1

| Experimental Example | Self inductance | Mutual inductance | Coupling Coefficient (k) |
|---|---|---|---|
| 1 | 0.0806 μH | −0.0393 μH | −0.488 |

Looking at the experimental results in Table 1, when the number of turns of the first and second coil portions 210 and 220 is the same as the number of turns of each of the first coil portion 210 or the second coil portion 220, it can be seen that the absolute value of the coupling coefficient is close to about 0.5. According to an embodiment of the present disclosure, by forming a region in which coil portions overlap in a single coil component, the coupling coefficient may be adjusted without increasing the size of the component.

Referring to FIG. 3, the number of turns of the first and second coil portions 210 and 220 wound on the third core portion 130 may be greater than the number of turns of the first coil portion 210 wound on the first core portion 110. In addition, the number of turns of the first and second coil portions 210 and 220 wound on the third core portion 130 may be greater than the number of turns of the second coil portion 220 wound on the second core portion 120.

Referring to FIG. 3, a separation distance between respective turns of the first and second coil portions 210 and 220 wound on the third core portion 130 may be less than a separation distance between turns of the first coil portion 210 formed on the first core portion 110. In addition, the separation distance between the respective turns of the first and second coil portions 210 and 220 wound on the third core portion 130 may be less than a separation distance between turns of the second coil portion 220 formed on the second core portion 120. For example, since the number of turns of the first and second coil portions 210 and 220 wound on the third core portion 130 increases, the separation distance between the respective turns of the first and second coil portions 210 and 220 wound on the third core portion 130 may be decreased by the degree of the above-described increase in the number of turns. The configuration is not necessarily limited thereto, and for example, even in the case in which the number of turns of the first and second coil portions 210 and 220 wound on the third core portion 130 is increased, the separation distance between the respective turns of the first and second coil portions 210 and 220 wound on the third core portion 130 may not decrease.

Meanwhile, referring to FIG. 4, the number of turns of the first and second coil portions 210 and 220 wound on the third core portion 130 may be less than the number of turns the first coil portion 210 wound on the first core portion 110. In addition, the number of turns of the first and second coil portions 210 and 220 wound on the third core portion 130 may be less than the number of turns of the first coil portion 210 wound on the first core portion 110.

Referring to FIG. 4, a separation distance between the turns of the first and second coil portions 210 and 220 wound on the third core portion 130 may be greater than the separation distance between turns of the first coil portion 210 formed on the first core portion 110. In addition, the separation distance between the turns of the first and second coil portions 210 and 220 wound on the third core portion 130 may be greater than the separation distance between turns of the second coil portion 220 formed on the second core portion 120. For example, since the number of turns of the first and second coil portions 210 and 220 wound on the third core portion 130 is reduced, the separation distance between the turns of the first and second coil portions 210 wound on the third core portion 130 220) may increase by the above-described reduction. The configuration is not necessarily limited thereto, and for example, even in the case in which the number of turns of the first and second coil portions 210 and 220 wound on the third core portion 130 is reduced, the separation distance between the turns of the first and second coil portions 210 and 220 wound on the third core portion 130 may not increase.

Referring to FIG. 2, the first coil portion 210 has one end 211 wound around the third core portion 130, and the other end 212 extending to the first core portion 210 to form a turn in the first direction from one end.

The second coil portion 220 has one end 221 wound on the third core portion 130 and the other end 222 extending to the second core portion 120 to forma turn in the second direction from one end.

The one end 211 of the first coil portion 210 is disposed between the one end 221 and the other end 222 of the second coil portion 220, and the one end 221 of the second coil portion 220 may be disposed between the one end 211 and the other end 212 of the first coil portion 210.

In this embodiment, the first and second coil portions 210 and 220 may be wound in the same direction or may be wound in different directions. In these cases, when the number of windings of the first and second coil portions 210 and 220 wound on the third core portion 130 is increased, the mutual inductance between the first and second coil portions 210 and 220 increases and the coupling coefficient may increase.

On the other hand, when the number of windings of the first and second coil portions 210 and 220 wound on the third core portion 130 is reduced, the mutual inductance between the first and second coil portions 210 and 220 decreases, resulting in a reduction in coupling coefficient.

For example, by increasing or decreasing the number of windings of the first and second coil portions 210 and 220 wound on the third core portion 130, the coupling coefficient of the coil component may be easily adjusted.

In some embodiments, for example, referring to FIG. 2, the first and second coil portions 210 and 220 may be wound in different directions. For example, the first and second directions, which are the turning directions of the first and second coil portions 210 and 220, may be opposite to each other. In this case, the directions of magnetic fluxes formed by the first and second coil portions 210 and 220 inside the third core portion 130 are opposite to each other, thereby canceling the magnetic flux. In this case, as described above, when the number of windings of the first and second coil portions 210 and 220 wound on the third core portion 130 is increased, mutual inductance between the first and second coil portions 210 and 220 increases, and thus, the coupling coefficient increases. Conversely, when the number of windings of the first and second coil portions 210 and 220 wound on the third core portion 130 decreases, the mutual inductance between the first and second coil portions 210 and 220 decreases, and thus, the coupling coefficient decreases.

In the case of related art coupled inductor, a coupling coefficient is adjusted using a thickness between upper and lower coil portions, but there is a problem of limitations in reducing the thickness of the coil portion, and a problem in that the size of the component increases when a distance between the coil portions is increased. In the case of this embodiment of the present disclosure, by forming a region in which respective coil portions overlap in a single coil portion, the coupling coefficient may be adjusted without increasing the size of the component on the X-Y plane having a relatively spatial margin.

The insulating layer (not illustrated) may be disposed along the surfaces of the coil portions 210 and 220. The insulating layer (not illustrated) is to protect and insulate the turns of the first and second coil portions 210 and 220, and may include a known insulating material such as parylene. Any insulating material included in the insulating layer (not illustrated) may be used, and there is no particular limitation. The insulating layer (not illustrated) may be formed by a method such as vapor deposition, but is not limited thereto.

Second Embodiment

A coil component according to a second embodiment is different from the coil component according to the first embodiment in that a coil portion 200 is formed by plating. Therefore, in describing the present embodiment, only the coil portion 200, different from the first embodiment, will be described. For the rest of the configuration of the present embodiment, the description in the first embodiment may be applied as it is.

First and second coil portions 210 and 220 may be formed of a seed layer and at least one plating layer formed on the seed layer.

For example, when the first and second coil portions 210 and 220 are formed by plating on one surface of the core portion 100, the first and second coil portions 210 and 220 may include a seed layer such as an electroless plating layer or the like, and an electroplating layer. In this case, the electroplating layer may have a single-layer structure or a multilayer structure. The electroplating layer of a multilayer structure may be formed to have a conformal film structure in which one electroplating layer is covered by another electroplating layer, or may be formed to have a shape in which another electroplating layer is stacked on only one surface of one electroplating layer. The first and second coil portions 210 and 220 may be formed of a conductive material such as copper (Cu), aluminum (Al), silver (Ag), tin (Sn), gold (Au), nickel (Ni), lead (Pb), and titanium (Ti) or alloys thereof, but the material thereof is not limited thereto.

As set forth above, according to an exemplary embodiment, by winding in a bifilar shape such that a plurality of adjacent conductors overlap each other, the coupling coefficient may be adjusted to a required value without increasing the thickness of a component.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A coil component comprising:
a core portion; and
first and second coil portions wound to form at least one or more turns on the core portion,
wherein the core portion includes a first core portion on which the first coil portion is wound, a second core portion on which the second coil portion is wound, and a third core portion which is disposed to be spaced apart from and between the first and second core portions and on which the first and second coil portions are wound to overlap each other, and
wherein the first coil portion is not wound on the second core portion, and the second coil portion is not wound on the first core portion.

2. The coil component of claim 1, wherein the first and second coil portions wound on the third core portion are alternately disposed with each other.

3. The coil component of claim 1, wherein the number of turns of the first and second coil portions wound on the third core portion is the same as the number of turns of the first coil portion wound on the first core portion or the number of turns of the second coil portion wound on the second core portion.

4. The coil component of claim 1, wherein the number of turns of the first and second coil portions wound on the third core portion is greater than the number of turns of the first coil portion wound on the first core portion.

5. The coil component of claim 1, wherein the number of turns of the first and second coil portions wound on the third core portion is greater than the number of turns of the second coil portion wound on the second core portion.

6. The coil component of claim 1, wherein the number of turns of the first and second coil portions wound on the third core portion is less than the number of turns of the first coil portion wound on the first core portion.

7. The coil component of claim 1, wherein the number of turns of the first and second coil portions wound on the third core portion is less than the number of turns of the second coil portion wound on the second core portion.

8. The coil component of claim 1, wherein the first coil portion has one end wound on the third core portion, and an other end extending from the one end to the first core portion to form a turn in a first direction, and the second coil portion has one end wound on the third core portion, and an other end extending from the one end to the second core portion to form a turn in a second direction.

9. The coil component of claim 8, wherein the first direction and the second direction are opposite to each other.

10. The coil component of claim 8, wherein the one end of the first coil portion is disposed between one end and the other end of the second coil portion, and the one end of the second coil portion is disposed between one end and the other end of the first coil portion.

11. The coil component of claim 1, wherein a separation distance between turns of the first and second coil portions wound on the third core portion is less than a separation distance between turns of the first coil portion wound on the first core portion.

12. The coil component of claim 1, wherein a separation distance between turns of the first and second coil portions wound on the third core portion is greater than a separation distance between turns of the first coil portion wound on the first core portion.

13. The coil component of claim 1, wherein the core portion constitutes a closed loop.

14. The coil component of claim 1, wherein the first and second coil portions are comprised of copper conductors coated with an insulating layer.

15. The coil component of claim 1, wherein the first and second coil portions are comprised of a plating layer.

16. A coil component comprising:

a core portion; and first and second coil portions forming at least one or more turns wound on the core portion, wherein the core portion includes a first core portion on which the first coil portion is wound, a second core portion on which the second coil portion is wound, and a third core portion, which is spaced apart from and between the first and second core portions and on which the first and second coil portions are wound as bifilar coils with respect to each other, and wherein the first coil portion is not wound on the second core portion, and the second coil portion is not wound on the first core portion.

17. A coil component comprising:

a core having a first core portion, a second core portion and a third core portion disposed between the first and the second core portions such that the first, third and second core portions are contiguous;

a first coil portion wound around the first and third core portions and having a first end wound around the first core portion and a second end wound around a section of the third core portion proximal to the second core portion;

a second coil portion wound around the second and third core portions and having a first end wound around the second core portion and a second end wound around a section of the third core portion proximal to the first core portion so as to overlap at least a portion of the first coil portion wound around the third core portion, wherein the first coil portion is not wound on the second core portion, and the second coil portion is not wound on the first core portion.

18. The coil component of claim 17, wherein a number of turns of the first coil portion wound around the third core portion is equal to the number of turns of the second coil portion wound around the third core portion.

19. The coil component of claim 17, wherein a first end of each of the first and second coil portions is wound around the third core portion, a second end of the first coil portion is wound around the first core portion, and a second end of the second coil portion is wound around the second core portion.

20. The coil component of claim 17, wherein a direction of winding of the first coil portion around the first and third core portions is same as that of the second coil portion around the second and third core portions.

* * * * *